(12) United States Patent
Luo et al.

(10) Patent No.: US 11,803,052 B2
(45) Date of Patent: Oct. 31, 2023

(54) HEAD-MOUNTED EYE TRACKING SYSTEM

(71) Applicant: Industrial Technology Research Institute, Hsinchu (TW)

(72) Inventors: Cheng-Jhih Luo, Hualien County (TW); Chia-Hsin Chao, Hsinchu County (TW); Chun-Wen Chu, Hsinchu County (TW); Ching-Ya Yeh, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 79 days.

(21) Appl. No.: 17/229,846

(22) Filed: Apr. 13, 2021

(65) Prior Publication Data

US 2022/0206294 A1   Jun. 30, 2022

(30) Foreign Application Priority Data

Dec. 28, 2020   (TW) ................. 109146422

(51) Int. Cl.
*G02B 27/00* (2006.01)
*G02B 27/01* (2006.01)

(52) U.S. Cl.
CPC ..... *G02B 27/0093* (2013.01); *G02B 27/0172* (2013.01); *G02B 2027/014* (2013.01)

(58) Field of Classification Search
CPC ............ G02B 27/0093; G02B 27/0172; G02B 2027/014
See application file for complete search history.

(56) References Cited

U.S. PATENT DOCUMENTS

| 10,698,483 | B1* | 6/2020 | Ouderkirk | .......... G02B 27/0176 |
| 2020/0183155 | A1 | 6/2020 | Xie et al. | |
| 2020/0271936 | A1* | 8/2020 | Leibovici | ............. G03H 1/0244 |
| 2021/0154344 | A1* | 5/2021 | Salters | .................. B08B 7/0057 |

FOREIGN PATENT DOCUMENTS

| CN | 108205374 | | 6/2018 | |
| CN | 111552085 | | 8/2020 | |
| CN | 111781722 | | 10/2020 | |
| CN | 111781722 A | * | 10/2020 | ......... G02B 27/0093 |
| TW | 201910865 | | 3/2019 | |
| TW | 202014757 | | 4/2020 | |
| WO | 2019070405 | | 4/2019 | |

OTHER PUBLICATIONS

"Office Action of Taiwan Counterpart Application", dated Oct. 4, 2021, p. 1-p. 5.

* cited by examiner

*Primary Examiner* — Amit Chatly
(74) *Attorney, Agent, or Firm* — JCIPRNET

(57) ABSTRACT

A head-mounted eye tracking system including an optical combiner, an eye tracker and a signal processor is provided. The optical combiner includes an optical coupler. The eye tracker is at least partially disposed on the optical combiner and is suitable for sensing an eyeball movement of a wearer. The eye tracker includes a plurality of light-emitting devices and a plurality of sensing devices. The plurality of light-emitting devices are suitable for emitting tracking beams. The plurality of sensing devices are suitable for receiving the tracking beams reflected by the eyeball of the wearer. The signal processor is signally connected to the eye tracker.

12 Claims, 14 Drawing Sheets

HEAD-MOUNTED EYE TRACKING SYSTEM

CROSS-REFERENCE TO RELATED APPLICATION

This application claims the priority benefit of Taiwan application serial no. 109146422, filed on Dec. 28, 2020. The entirety of the above-mentioned patent application is hereby incorporated by reference herein and made a part of this specification.

TECHNICAL FIELD

The disclosure relates to a tracking system, and more particularly to a head-mounted eye tracking system.

BACKGROUND

In order to provide audio and video effects with higher quality, more focus has been laid on virtual reality (VR), augmented reality (AR) and mixed reality (MR) and the like for the development of new generation of display technologies. The head-mounted eye tracking system is one of the approaches adopted to realize these technologies.

Generally speaking, a head-mounted eye tracking system tracks the movement of eyeballs by using an eye tracker installed therein, and adjusts the displayed image according to the direction of vision so as to improve the reality effect. Take the current eye tracker as an example, which uses a camera for capturing moving images to track and determine the position of eyeballs. However, such tracking method is often restricted to the frame rate of the camera. In addition, due to the high complexity, large volume and/or heavy weight of the camera, the wearer might feel discomfortable when in use.

SUMMARY

The disclosure provides a head-mounted eye tracking system, which is adaptable for sensing the eyeball movement of a wearer.

In the disclosure, a head-mounted eye tracking system includes an optical combiner, an eye tracker and a signal processor. The optical combiner includes an optical coupler. The eye tracker is at least partially disposed on the optical combiner and is adaptable for sensing an eyeball movement of a wearer. The eye tracker includes a plurality of light-emitting devices and a plurality of sensing devices. The plurality of light-emitting devices are adaptable for emitting tracking beams. The plurality of sensing devices are adaptable for receiving the tracking beams reflected by the eyeball of the wearer. The signal processor is signally connected to the eye tracker.

Several exemplary embodiments accompanied with figures are described in detail below to further describe the disclosure in details.

DETAILED DESCRIPTION OF DISCLOSED EMBODIMENTS

Figure 1A:
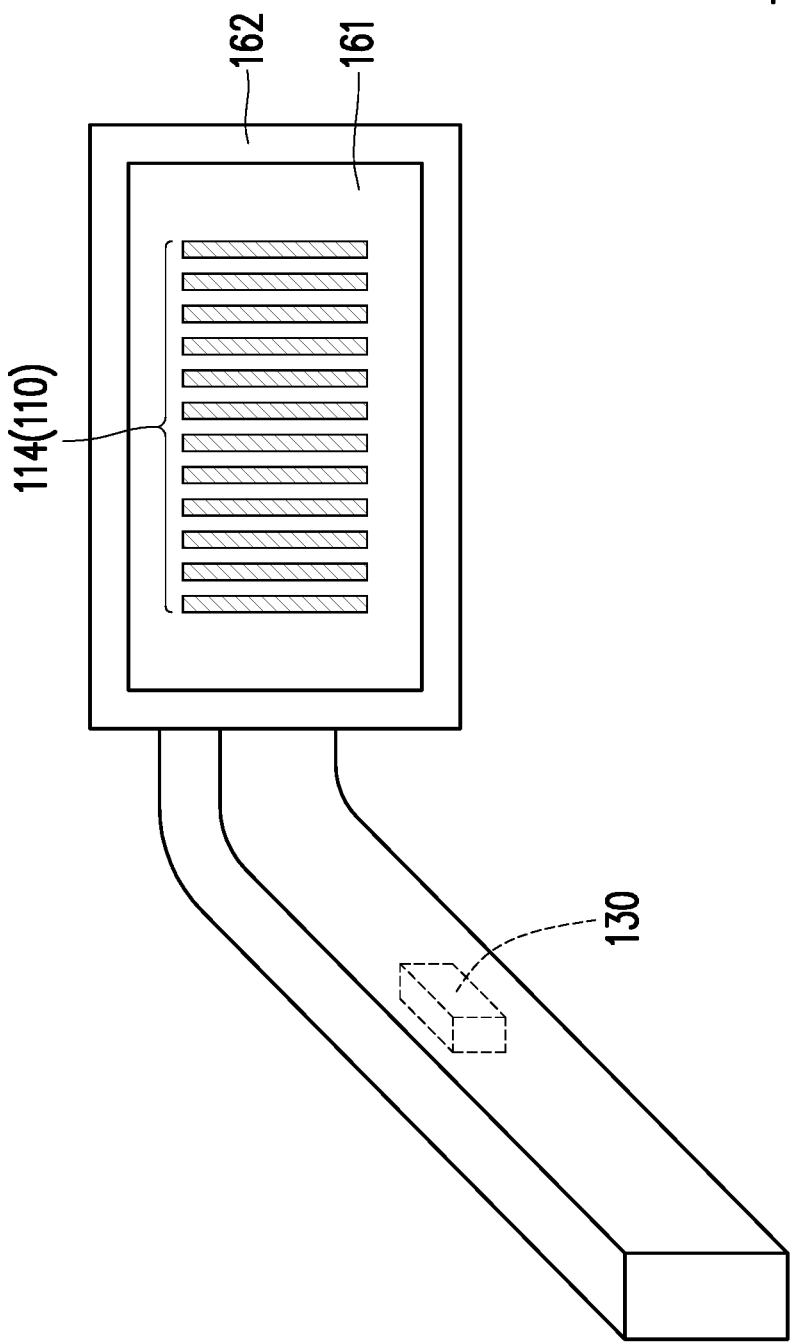
FIG. 1A is a partial perspective view of a head-mounted eye tracking system according to the first embodiment of the disclosure.

In the drawings, for the purpose of clarity, the size of some elements or film layers may be enlarged or reduced. In addition, for clarity, some elements or film layers may be omitted or partially marked in the drawings. In addition, the numerical value indicated in the specification may include the numerical value and the deviation value within the deviation range acceptable to a person having ordinary knowledge in the art.

In the following embodiments or corresponding drawings, the same or similar components are represented by the same or similar reference numerals, and have the same or similar functions, and related description is omitted. In addition, for clarity, perhaps not all the light-emitting devices, sensing devices and/or other similar devices are labeled or drawn one by one in the drawings.

Figure 1B:
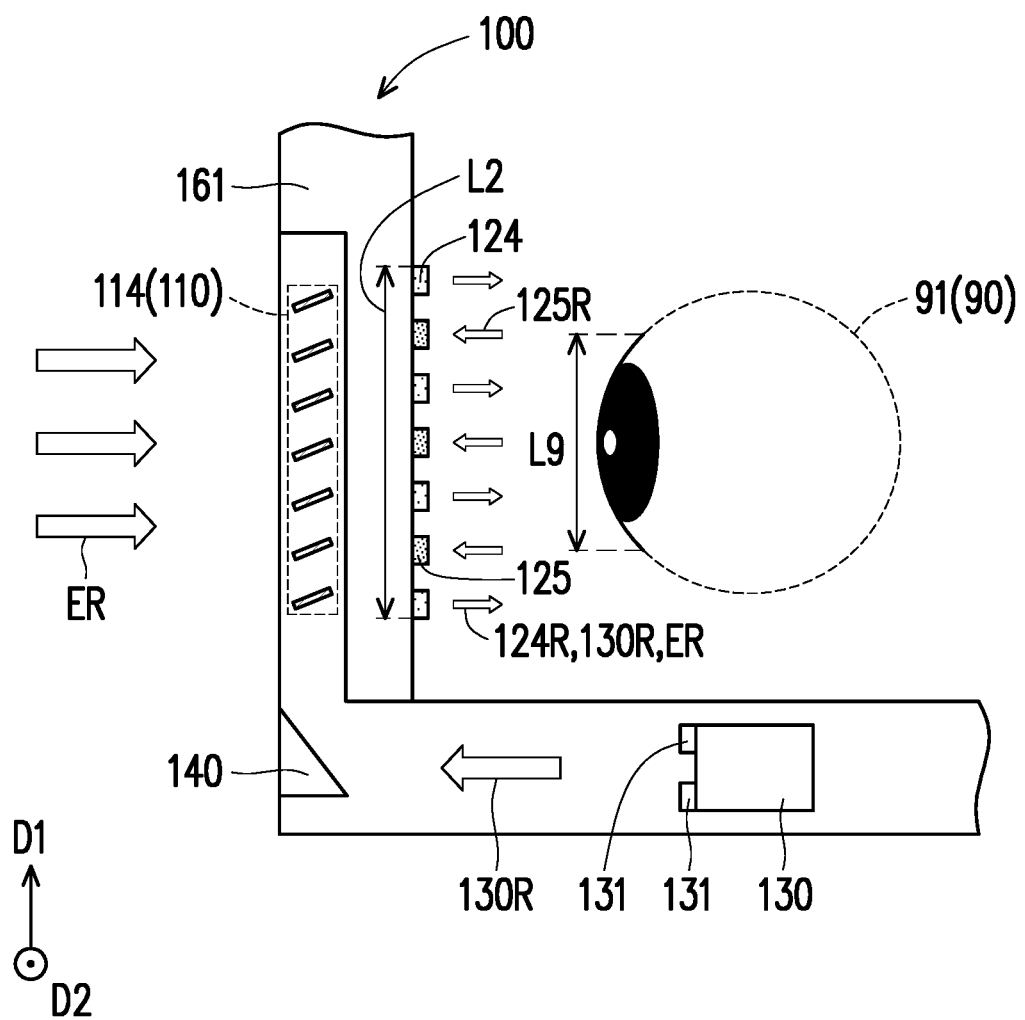
FIG. 1B is a schematic partial top view of a head-mounted eye tracking system according to the first embodiment of the disclosure.
Figure 1C:
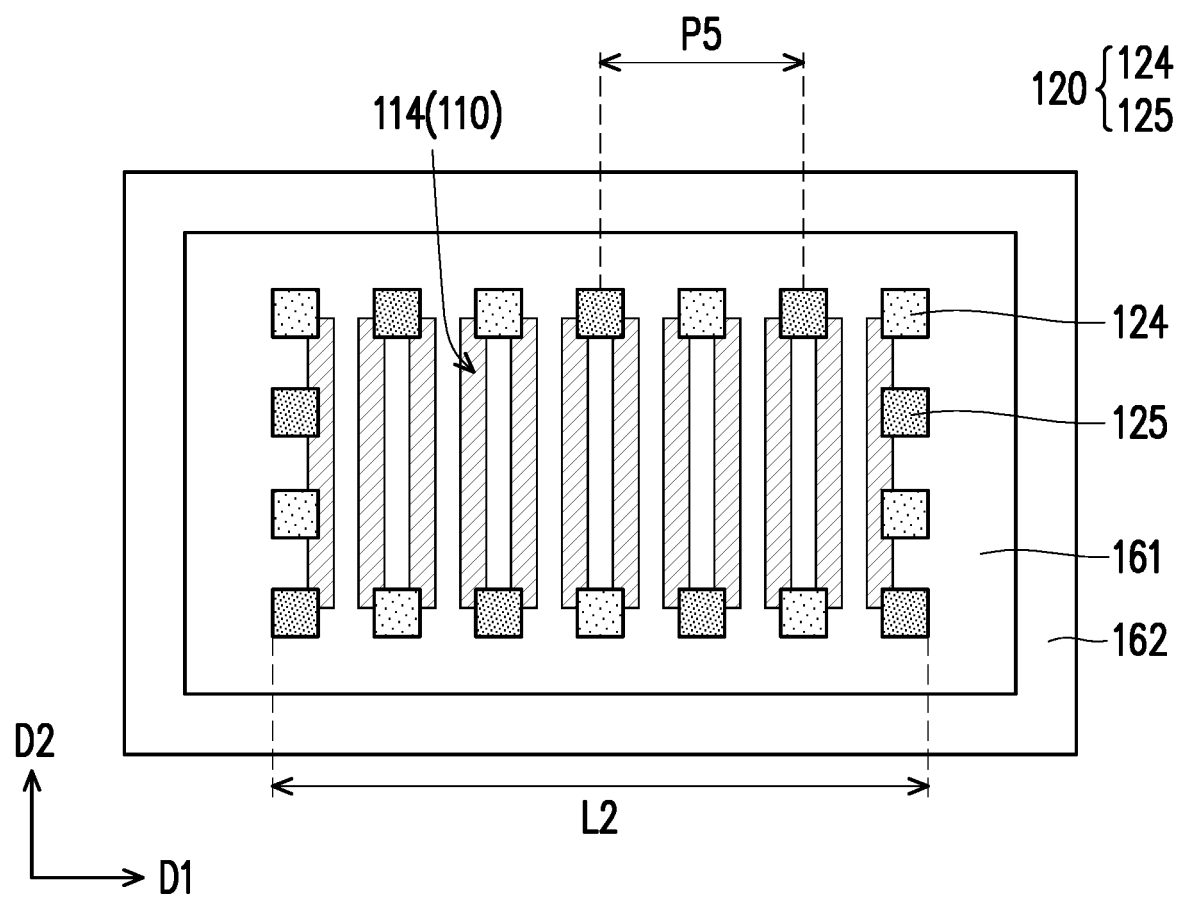
FIG. 1C is a schematic partial front view of a head-mounted eye tracking system according to the first embodiment of the disclosure.

FIG. 1A is a partial perspective view of a head-mounted eye tracking system according to the first embodiment of the disclosure. FIG. 1B is a schematic partial top view of a head-mounted eye tracking system according to the first embodiment of the disclosure. FIG. 1C is a schematic partial front view of a head-mounted eye tracking system according to the first embodiment of the disclosure. In addition, for clarity, not all the light-emitting devices 124, the sensing devices 125, and/or the display devices 131 are marked or shown one by one in FIG. 1A to FIG. 1C.

Referring to FIG. 1A to FIG. 1C, the head-mounted eye tracking system 100 includes an optical combiner 110 and an eye tracker 120. The optical combiner 110 includes an optical coupler 114. The number and configuration of the optical coupler 114 can be adjusted and designed according to actual requirements, which are not limited in the disclosure. The eye tracker 120 is disposed on the optical combiner 110. The eye tracker 120 is adaptable for sensing the movement of the eyeball 91 of the wearer 90. In this embodiment, the wearer 90 includes but not limited to a human being.

In this embodiment, the optical coupler 114 may include a coupler mirror, but the disclosure is not limited thereto. In an embodiment, the optical coupler similar to the optical coupler 114 may include an optical grating coupler. In an embodiment, the optical coupler similar to the optical coupler 114 may include a volume holographic grating (VHG), a surface relief grating, or a liquid crystal film coupler.

In this embodiment, the head-mounted eye tracking system 100 may further include a light-transmitting substrate 161. The optical combiner 110 may be disposed on one side of the light-transmitting substrate 161. In an embodiment, the light-transmitting substrate 161 may include glass, polymer (for example, polyimide (PI), polyethylene terephthalate (PET), but not limited thereto), or other suitable light-transmitting materials. In an embodiment, the light-transmitting substrate 161 may be embedded in the frame 162, but the disclosure is not limited thereto.

In this embodiment, the head-mounted eye tracking system 100 may further include a display 130. The display 130 is adapted to emit a display beam 130R. The display beam 130R may be irradiated to the eyeball 91 of the wearer 90 through the optical coupler 114 of the optical combiner 110.

In an embodiment, the display 130 may include one or more display devices 131. The display device 131 of the display 130 is, for example, a light emitting diode (LED), a micro LED, an organic LED, or a laser diode that can emit a corresponding display beam 130R. Those skilled in the art can select from the above according to actual needs. The display beam 130R includes, for example, red light, green light, blue light or other suitable light visible to the wearer 90. The display beam 130R emitted from the display 130 can be guided to the optical combiner 110 through a suitable light guide 140. The external beam ER and the display beam 130R can be irradiated to the eyeball 91 of the wearer 90 through the optical coupler 114 of the optical combiner 110. In other words, the eyeball 91 of the wearer 90 can receive the external beam ER and the display beam 130R through the optical coupler 114. In addition, the external beam ER may include ambient light or light emitted by other displays that are not shown.

In an embodiment, the display device 131 of the display 130 may include a light emitting diode, but the disclosure is not limited thereto. For example, the display device 131 may include a micro LED (μLED) with a dimension substantially of (5 micrometers (μm)~100 μm)×(5 μm~100 μm).

In FIG. 1B, only one kind of light guide 140 is illustrated as an example, but the disclosure is not limited thereto. In an embodiment, the light guide 140 may include a reflecting member, a refracting member, and/or other suitable light guides. For example, the light guide 140 may include a mirror, a prism, a lens, an optical fiber, and/or a light pipe.

In this embodiment, the eye tracker 120 may include a plurality of light-emitting devices 124 and a plurality of sensing devices 125.

In an embodiment, the plurality of light-emitting devices 124 and/or the plurality of sensing devices 125 may be disposed on the light-transmitting substrate 161 and located on the other side, for example, the opposite side relative to the optical combiner 110, but the disclosure is not limited thereto.

The light-emitting device 124 of the eye tracker 120 is adapted to directly or indirectly emit a tracking beam 124R directed to the eyeball 91 of the wearer 90. The tracking beam 124R includes, for example, infrared light or other suitable light that is invisible to the wearer 90 and/or less harmful to the tissue of the eyeball 91. The luminous quantity of the tracking beam 124R can be adjusted according to design requirements and must comply with biological safety regulations, which is not limited in the disclosure.

The sensing device 125 of the eye tracker 120 includes, for example, a reverse-biased LED, a photodiode (PD) or a light sensing device under a plane of optical layer with a diffraction pattern (such as mura mask, but not limited thereto). After the tracking beam 124R irradiates the eyeball 91 of the wearer 90, a corresponding reflection can be generated in the corresponding region or direction according to the corresponding eyeball tissue (e.g., the iris, pupil, lens, cornea, etc.). For example, under the irradiation of the tracking beam 124R of substantially the same light wavelength, the eyeball tissue may have light reflections of different directions and/or intensities at different positions. In this way, the movement of the eyeball 91 can be tracked by using the sensing device 125 which receives the tracking beam (or referred to as reflection beam 125R) reflected by the eyeball 91 of the wearer 90. That is, compared to a tracker that is used for a focusing optical element for imaging, the eye tracker 120 can track the movement of the eyeball 91 without imaging.

In an embodiment, the sensing device 125 can track the movement of the eyeball 91 by high-frequency sampling. For example, the sampling frequency of the sensing device 125 may be higher than the frame rate of general dynamic images. In an embodiment, the sampling frequency of the sensing device 125 can be greater than or equal to 250 Hertz (Hz), which can be determined by the circuit design of the sensor, but the disclosure is not limited thereto.

In this embodiment, among the plurality of sensing devices 125, the distance P5 between two adjacent sensing devices 125 is between 1 millimeter (mm) and 30 mm. In an embodiment, among the plurality of sensing devices 125, the distance P5 between two adjacent sensing devices 125 may be between 3 mm and 15 mm.

In this embodiment, the light-emitting device 124 may be a micro LED (μLED) with a dimension substantially of (5 μm-100 μm)×(5 μm-100 μm). In this way, part or all of the light-emitting devices 124 can be at least partially overlapped (that is, including partially overlapped or completely overlapped) the optical coupler 114. In other words, part or all of the light-emitting devices 124 may at least partially overlap the visible region of the eyeball 91 of the wearer 90.

In this embodiment, the sensing device 125 may be a reverse-biased μLED or a photodiode (PD) with a dimension substantially of (5 μm-100 μm)×(5 μm-100 μm). In this way, part or all of the sensing devices 125 can be partially or completely overlapped the optical coupler 114. In other words, part or all of the sensing devices 125 may at least partially overlap the visible region of the eyeball 91 of the wearer 90.

In an embodiment, the micro LED can emit light or perform light detection through different operating biases at different timings.

In this embodiment, a plurality of light-emitting devices 124 or a plurality of sensing devices 125 surround the optical coupler 114, but the disclosure is not limited thereto.

In this embodiment, in the first arrangement direction D1, part of the plurality of light-emitting devices 124 and part of the plurality of sensing devices 125 are arranged alternately with each other, but the disclosure is not limited thereto.

Figure 1D:
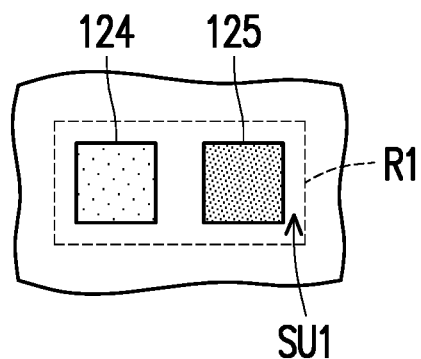
FIG. 1D is a schematic view of an arrangement of a light-emitting device and a sensing device of a head-mounted eye tracking system according to an embodiment of the disclosure.

Taking FIG. 1D as an example, in an embodiment, in a closed range R1 in the front view state, the light-emitting device 124 and the sensing device 125 adjacent to each other can be integrated into a sensing unit SU1. In the sensing unit SU1, the light-emitting device 124 and the sensing device 125 may be arranged alternately.

Figure 1E:
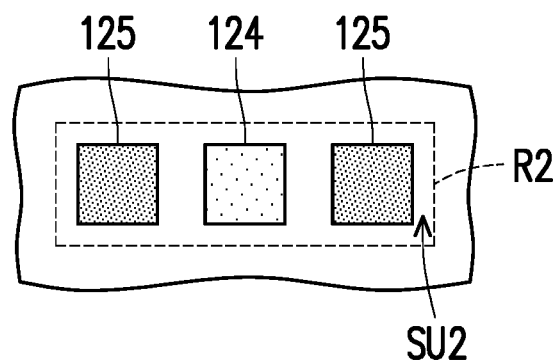
FIG. 1E is a schematic view of an arrangement of a light-emitting device and a sensing device of another head-mounted eye tracking system according to an embodiment of the disclosure.

Taking FIG. 1E as an example, in an embodiment, in a closed range R2 in the front view state, the light-emitting device 124 and the plurality of sensing devices 125 can be integrated into a sensing unit SU2. In the sensing unit SU2, the light-emitting device 124 and the sensing device 125 may be arranged alternately as shown in FIG. 1E.

Figure 1F:
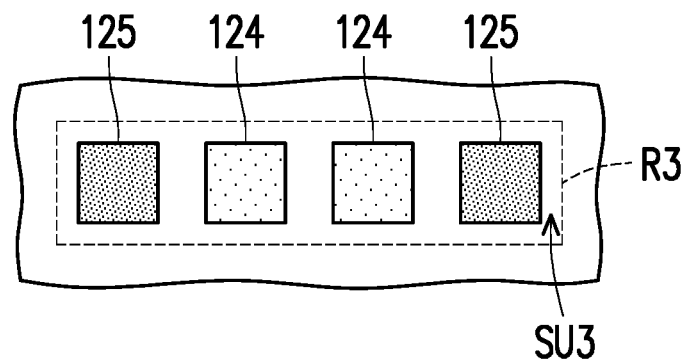
FIG. 1F is a schematic view of an arrangement of a light-emitting device and a sensing device of still another head-mounted eye tracking system according to an embodiment of the disclosure.

Taking FIG. 1F as an example, in an embodiment, in a closed range R3 in the front view state, a plurality of light-emitting devices 124 and a plurality of sensing devices 125 may be integrated into a sensing unit SU3. In the sensing unit SU3, one of the light-emitting devices 124 and one of the sensing devices 125 may be arranged alternately as shown in FIG. 1E.

In an embodiment, in a sensing unit, the number of sensing devices 125 may be greater than or equal to the number of light-emitting devices 124.

In this embodiment, in the second arrangement direction D2 perpendicular to the first arrangement direction D1, part of the plurality of light-emitting devices 124 and part of the plurality of sensing devices 125 are arranged alternately with each other, but the disclosure is not limited thereto.

In this embodiment, the number of light-emitting devices 124 and the number of sensing devices 125 can be arranged according to actual requirements. The light-emitting devices 124 and the sensing devices 125 may be arranged alternately in a regular manner or irregular manner as shown in FIG. 1C to FIG. 5, but the disclosure is not limited thereto. In this embodiment, the number of sensing devices 125 may be greater than or equal to the number of light-emitting devices 124.

Figure 2:
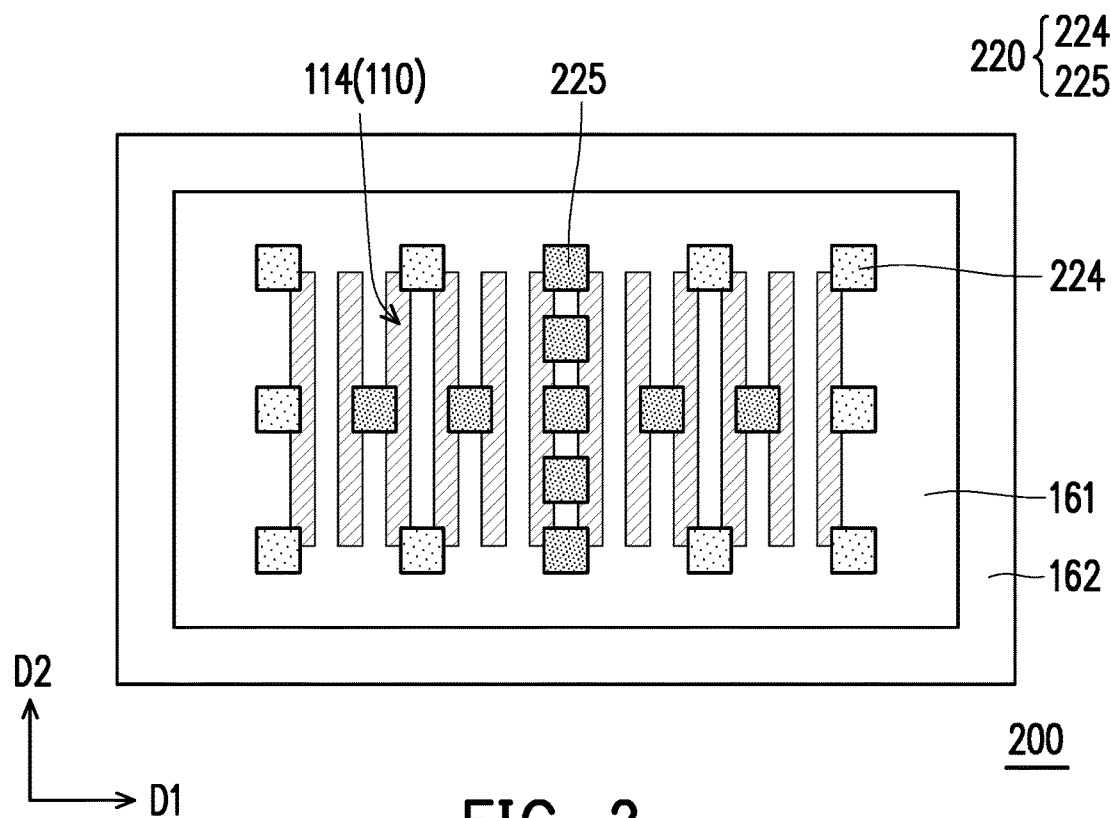
FIG. 2 is a schematic partial front view of a head-mounted eye tracking system according to the second embodiment of the disclosure.

FIG. 2 is a schematic partial front view of a head-mounted eye tracking system according to the second embodiment of the disclosure.

In this embodiment, the head-mounted eye tracking system 200 includes an optical combiner 110 and an eye tracker 220. The eye tracker 220 may include a plurality of light-emitting devices 224 and a plurality of sensing devices 225. The light-emitting devices 224 may be the same or similar to the light-emitting devices 124 in the previous embodiment. The sensing devices 225 may be the same or similar to the sensing devices 125 in the previous embodiment.

In this embodiment, a plurality of light-emitting devices 224 may surround the optical coupler 114, and a plurality of sensing devices 225 may be arranged in a cross shape.

Figure 3:
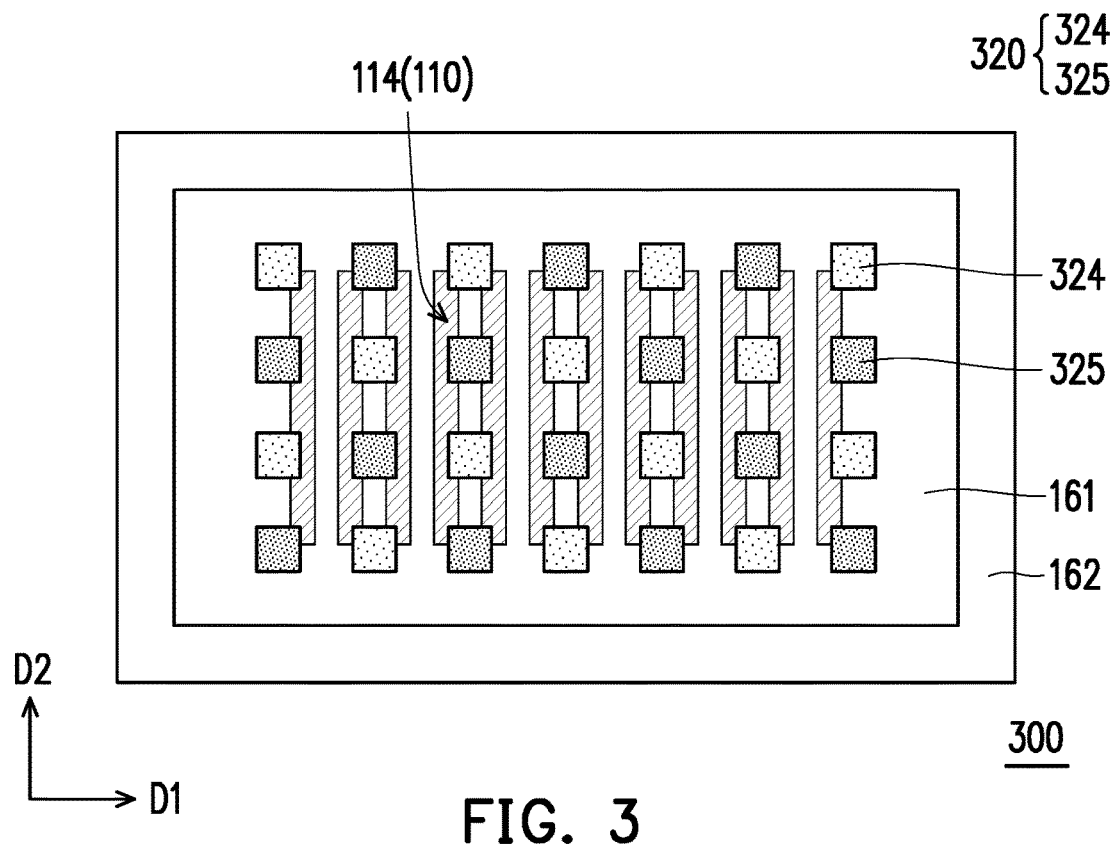
FIG. 3 is a schematic partial front view of a head-mounted eye tracking system according to the third embodiment of the disclosure.

FIG. 3 is a schematic partial front view of a head-mounted eye tracking system according to the third embodiment of the disclosure.

In this embodiment, the head-mounted eye tracking system 300 includes an optical combiner 110 and an eye tracker 320. The eye tracker 320 may include a plurality of light-emitting devices 324 and a plurality of sensing devices 325. The light-emitting devices 324 may be the same or similar to the light-emitting devices 124 in the previous embodiment. The sensing devices 325 may be the same or similar to the sensing devices 125 in the previous embodiment.

In this embodiment, part of the plurality of light-emitting devices 324 and part of the plurality of sensing devices 325 may be arranged alternately in the first arrangement direction D1, and part of the plurality of light-emitting devices 324 and part of the plurality of sensing devices 325 may be arranged alternately in the second arrangement direction D2, and the plurality of light-emitting devices 324 and the plurality of sensing devices 325 can be alternately arranged in an array.

Figure 4:
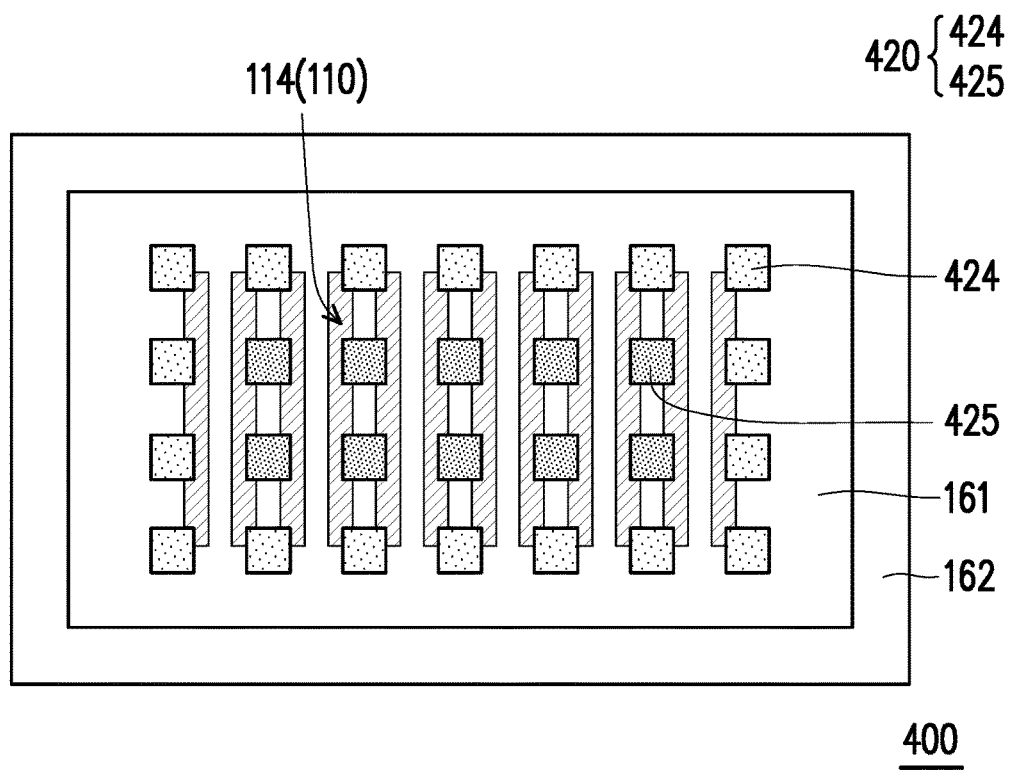
FIG. 4 is a schematic partial front view of a head-mounted eye tracking system according to the fourth embodiment of the disclosure.

FIG. 4 is a schematic partial front view of a head-mounted eye tracking system according to the fourth embodiment of the disclosure.

In this embodiment, the head-mounted eye tracking system 400 includes an optical combiner 110 and an eye tracker 420. The eye tracker 420 may include a plurality of light-emitting devices 424 and a plurality of sensing devices 425. The light-emitting devices 424 may be the same or similar to the light-emitting devices 124 in the previous embodiment. The sensing devices 425 may be the same or similar to the sensing devices 125 in the previous embodiment.

In this embodiment, a plurality of light-emitting devices 424 may surround the sensing devices 425 and the optical coupler 114, and the plurality of sensing devices 425 may be arranged in an array.

Figure 5:
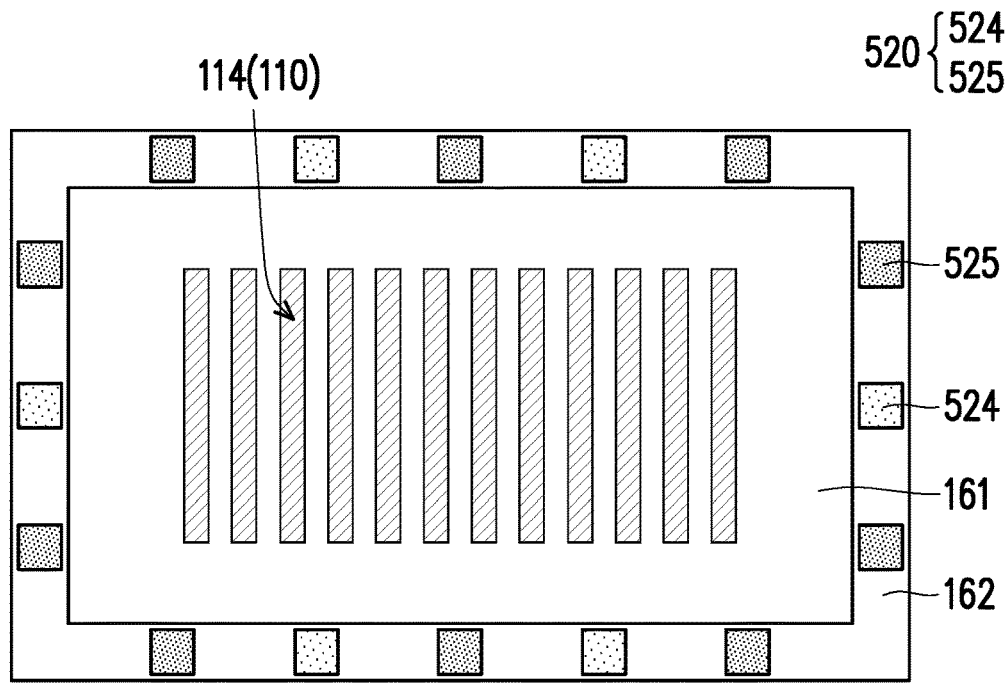
FIG. 5 is a schematic partial front view of a head-mounted eye tracking system according to the fifth embodiment of the disclosure.

FIG. 5 is a schematic partial front view of a head-mounted eye tracking system according to the fifth embodiment of the disclosure.

In this embodiment, the head-mounted eye tracking system 500 includes an optical combiner 110 and an eye tracker 520. The eye tracker 520 may include a plurality of light-emitting devices 524 and a plurality of sensing devices 525. The light-emitting devices 524 may be the same or similar to the light-emitting devices 124 in the previous embodiment. The sensing devices 525 may be the same or similar to the sensing devices 125 in the previous embodiment.

In this embodiment, a plurality of light-emitting devices 524 and/or a plurality of sensing devices 525 may be disposed on the frame 162.

In this embodiment, a plurality of light-emitting devices 524 or a plurality of sensing devices 525 may surround the optical coupler 114.

Figure 6A:
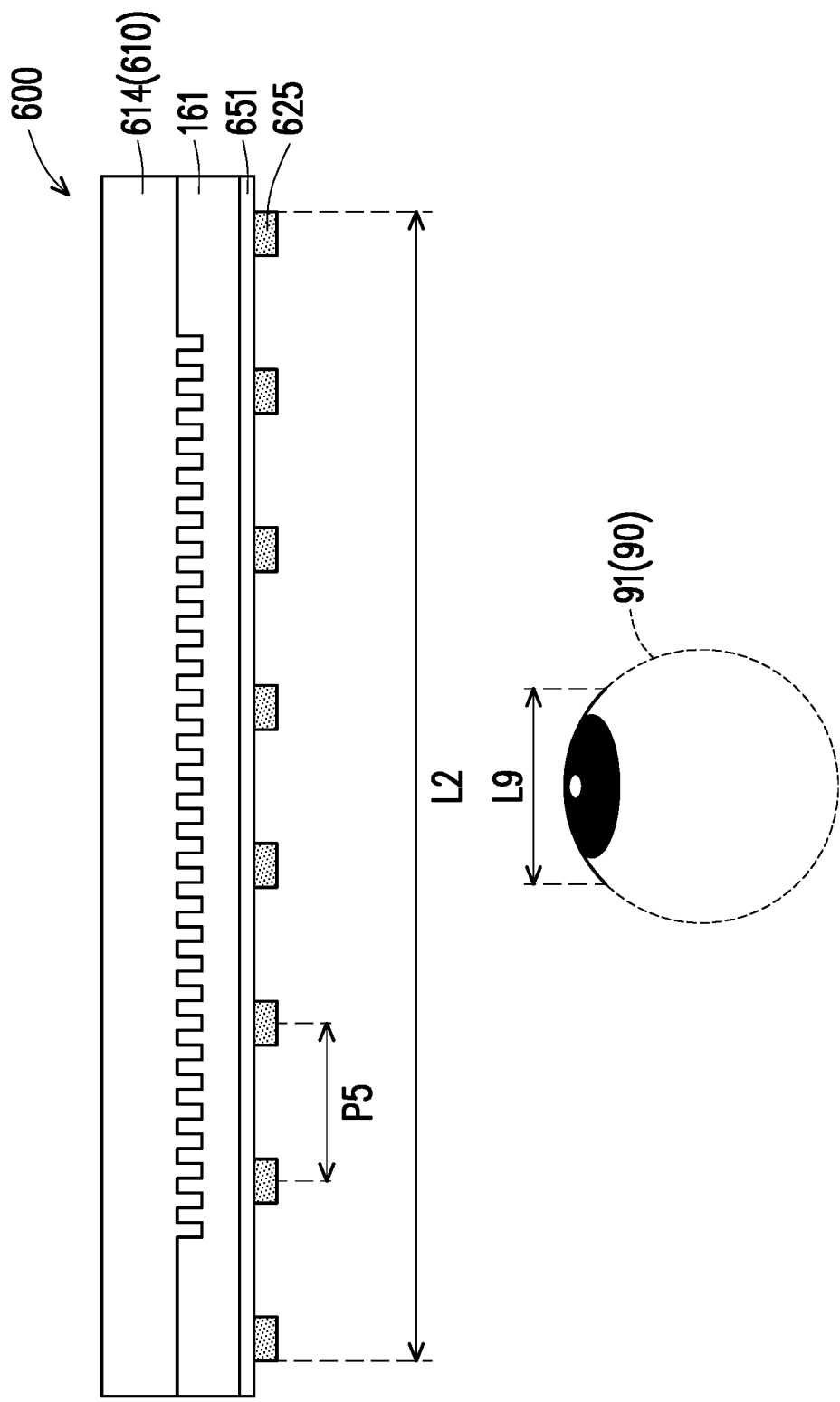
FIG. 6A is a schematic partial top view of a head-mounted eye tracking system according to the sixth embodiment of the disclosure.
Figure 6B:
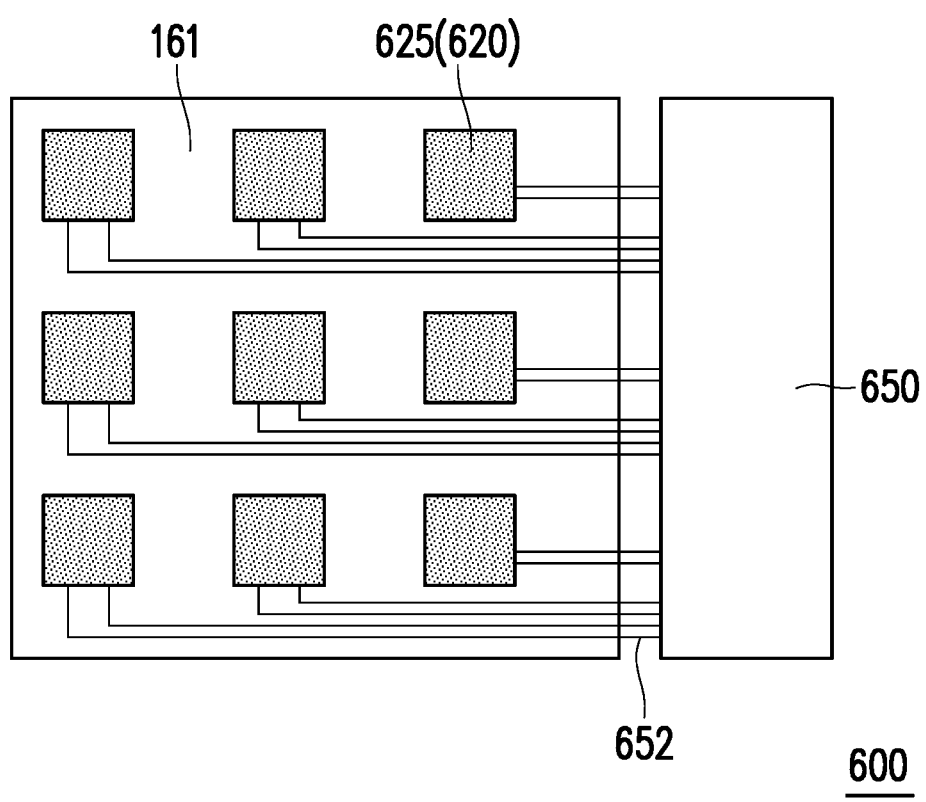
FIG. 6B is a schematic partial front view of a head-mounted eye tracking system according to the sixth embodiment of the disclosure.

FIG. 6A is a schematic partial top view of a head-mounted eye tracking system according to the sixth embodiment of the disclosure. FIG. 6B is a schematic partial front view of a head-mounted eye tracking system according to the sixth embodiment of the disclosure.

In this embodiment, the head-mounted eye tracking system 600 includes an optical combiner 610 and an eye tracker 620. The eye tracker 620 may include a plurality of light-emitting devices (which are not shown directly and may be the same or similar to the light-emitting devices 124 in the previous embodiment) and a plurality of sensing devices 625. The optical combiner 610 includes an optical coupler 614. The optical coupler 614 may include an optical grating coupler.

In this embodiment, the head-mounted eye tracking system 600 may further include a signal processor 650. The signal processor 650 can be signally connected to the eye tracker 620. For example, the optical signal or the corresponding electronic signal received by the sensing device 625 of the eye tracker 620 can be transmitted to the signal processor 650. For example, the signal processor 650 can transmit electronic signals to the light-emitting device (not shown directly, and may be the same or similar to the light-emitting device 124 in the foregoing embodiment) to drive the light-emitting device to emit light.

In this embodiment, the signal processor 650 can be signally connected to the eye tracker 620 in a wired signal transmission manner through the signal line 652 in the device layer 651, but the disclosure is not limited thereto.

In FIG. 6A and FIG. 6B, only the signal connection method between the signal processor 650 and a part of the sensing device 625 is shown exemplarily, but the disclosure is not limited thereto.

In an embodiment, the signal processor 650 may include a processing chip, but the disclosure is not limited thereto. For example, the signal processor 650 may include a computer or other processing systems (such as a cloud processing system).

In this embodiment, the device layer 651 may include a corresponding conductive film, an insulating film, and/or a semiconductor film. The conductive film, the insulating film, and/or the semiconductor film may constitute corresponding active devices, passive devices and/or circuits (such as signal lines 652).

In this embodiment, the signal line 652 at least may be formed by a part of the conductive pattern in the device layer 651, but the disclosure is not limited thereto. In other words, the signal line 652 may include a part of the conductive pattern in the device layer 651 (for example, the conductive film included in the device layer 651). The conductive pattern may be located on the light-transmitting substrate 161. In this embodiment, the conductive pattern and the sensing device 625 may be located on the same side of the light-transmitting substrate 161.

In this embodiment, the films, devices and/or layouts in the device layer 651 can be formed or arranged in a manner commonly used in the art, and will not be further described here.

Figure 7:
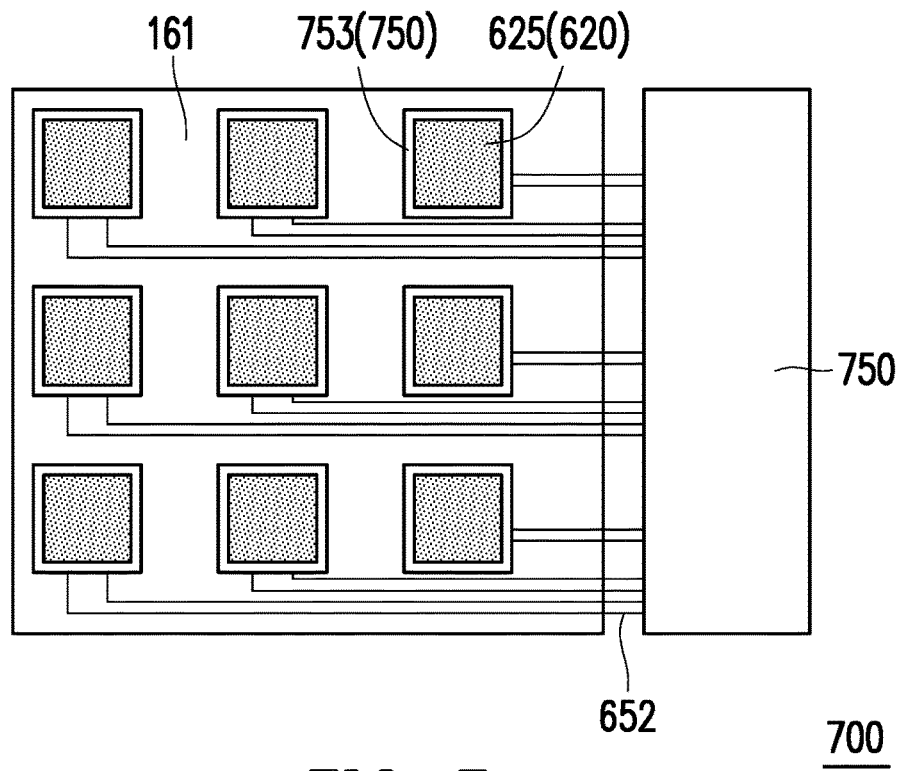
FIG. 7 is a schematic partial front view of a head-mounted eye tracking system according to the seventh embodiment of the disclosure.

FIG. 7 is a schematic partial front view of a head-mounted eye tracking system according to the seventh embodiment of the disclosure. The head-mounted eye tracking system 700 in this embodiment is similar to the head-mounted eye tracking system 600 in the sixth embodiment, and similar components used in the embodiment are denoted by the same reference numerals and have similar functions, and related description is omitted. In addition, for clarity, not all the sensing devices 625, signal lines 652, and/or processing devices 753 are labeled or shown one by one in FIG. 7.

In this embodiment, the head-mounted eye tracking system 700 includes an optical combiner (not shown directly, and may be the same as or similar to the optical combiner 110 or the optical combiner 610 in the foregoing embodiment), an eye tracker 620 and a signal processor 750.

In this embodiment, the signal processor 750 may be similar to the signal processor 650 in the previous embodiment. The signal processor 750 may further include a processing device 753. The processing device 753 can be signally connected (or electrically connected) to the corresponding sensing device 625 and/or the light-emitting device (not shown directly, and may be the same or similar to the light-emitting device 124 of the previous embodiment). The processing device 753 includes, for example, IC or μIC, but the disclosure is not limited thereto.

In this embodiment, the processing device 753 may be configured on the light-transmitting substrate 161, and the processing device 753 of the signal processor 750 may be configured between the optical combiner 610 and the sensing device 625 (shown in FIG. 6A).

In this embodiment, the processing device 753 of the signal processor 750 may at least partially overlap the sensing device 625 of the eye tracker 620, but the disclosure is not limited thereto.

Figure 8:
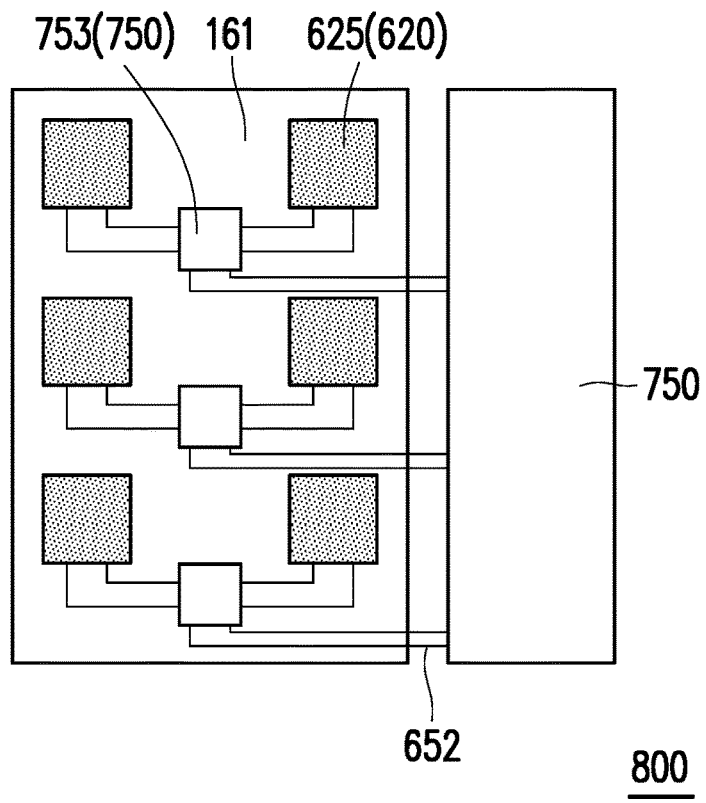
FIG. 8 is a schematic partial front view of a head-mounted eye tracking system according to the eighth embodiment of the disclosure.

FIG. 8 is a schematic partial front view of a head-mounted eye tracking system according to the eighth embodiment of the disclosure. The head-mounted eye tracking system 800 in this embodiment is similar to the head-mounted eye tracking system 700 in the seventh embodiment, and similar components in the embodiment are denoted by the same reference numerals and have similar functions, and related description is omitted. In addition, for clarity, not all the sensing devices 625, signal lines 652, and/or processing devices 753 are marked or shown one by one in FIG. 8.

In this embodiment, the processing device 753 of the signal processor 750 may not overlap the sensing device 625 of the eye tracker 620. In other words, the processing device 753 of the signal processor 750 can be far away from the sensing device 625 of the eye tracker 620.

Figure 9A:
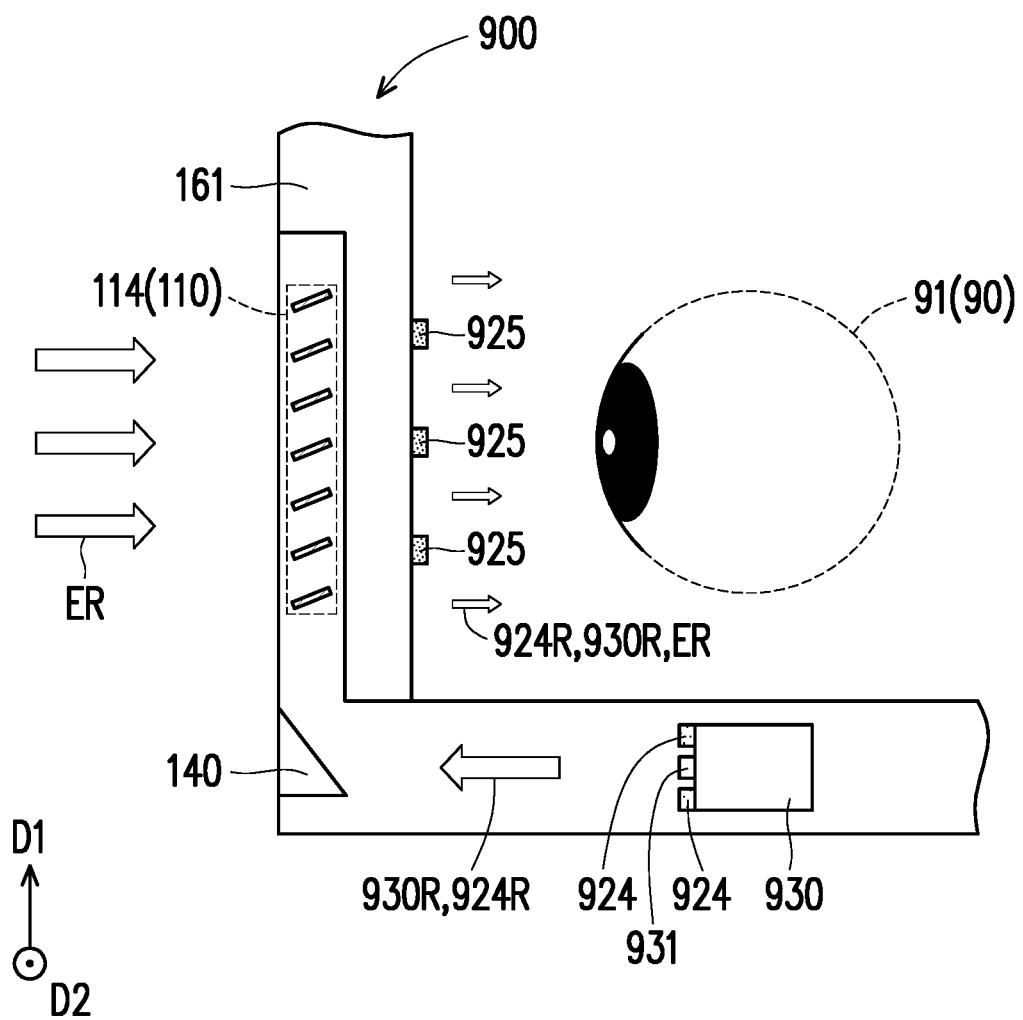
FIG. 9A is a schematic partial top view of a head-mounted eye tracking system according to the ninth embodiment of the disclosure.
Figure 9B:
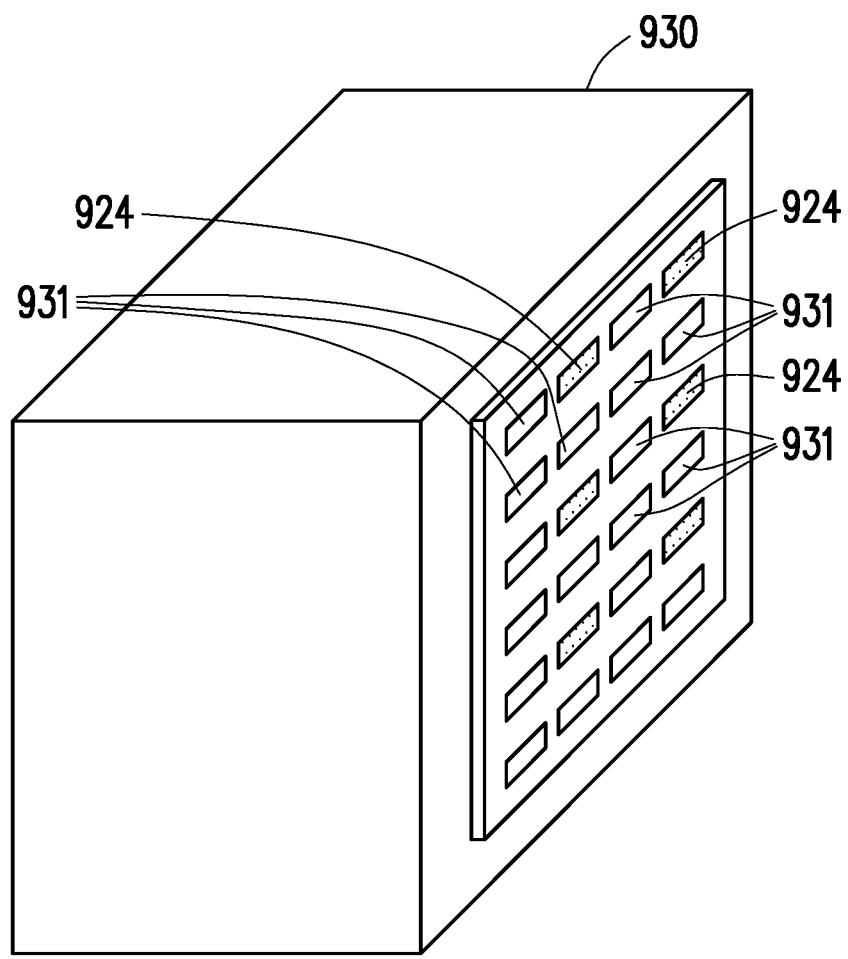
FIG. 9B is a partial perspective view of a head-mounted eye tracking system according to the ninth embodiment of the disclosure.
Figure 9C:
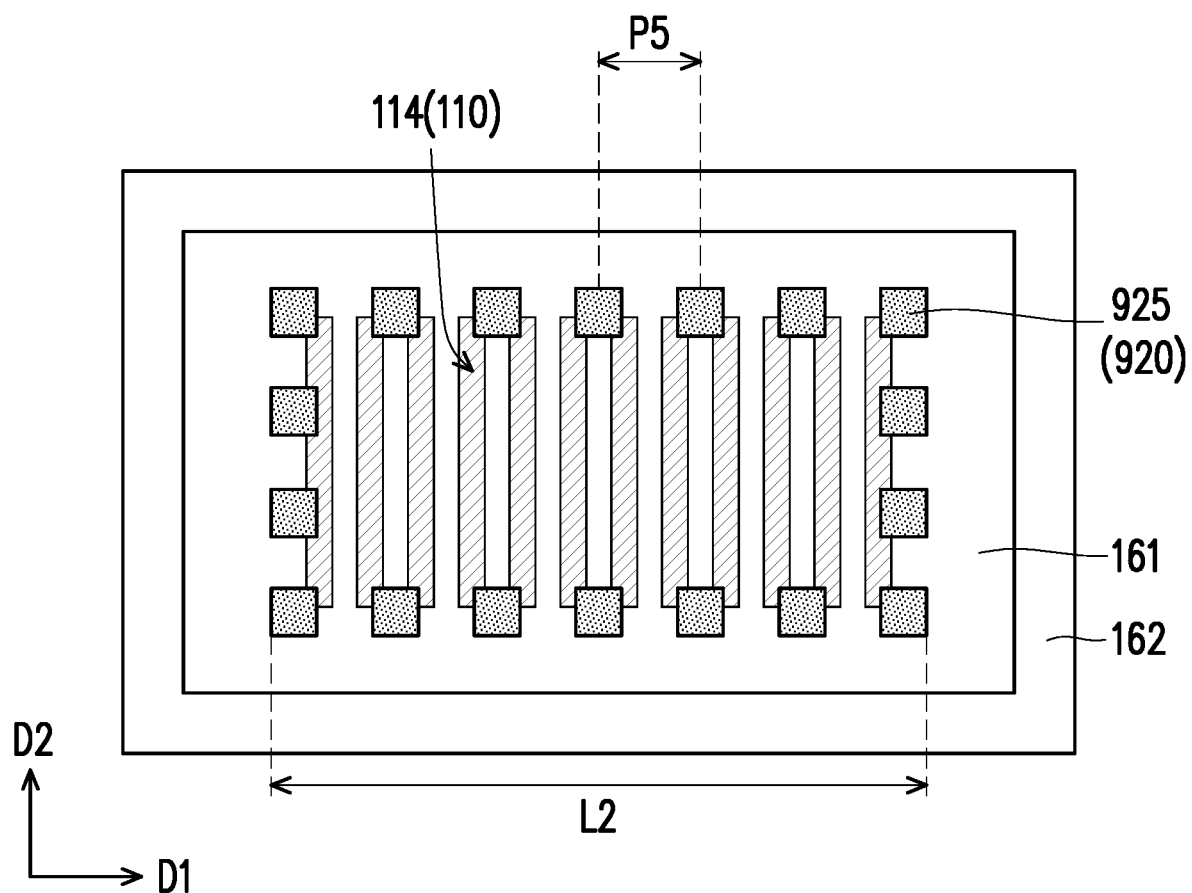
FIG. 9C is a schematic partial front view of a head-mounted eye tracking system according to the ninth embodiment of the disclosure.

FIG. 9A is a schematic partial top view of a head-mounted eye tracking system according to the ninth embodiment of the disclosure. FIG. 9B is a partial perspective view of a head-mounted eye tracking system according to the ninth embodiment of the disclosure. FIG. 9C is a schematic partial front view of a head-mounted eye tracking system according to the ninth embodiment of the disclosure. The head-mounted eye tracking system 900 in this embodiment is similar to the head-mounted eye tracking system 100 in the first embodiment, and similar components in the embodiment are denoted by the same reference numerals and have similar functions, and related description is omitted. In addition, for clarity, not all the light-emitting devices 924 and/or the sensing devices 925 are marked or shown one by one in FIG. 9A to FIG. 9C.

Referring to FIG. 9A to FIG. 9C, in this embodiment, the head-mounted eye tracking system 900 includes an optical combiner 110, an eye tracker 920, and a display 930. The eye tracker 920 may include a plurality of light-emitting devices 924 and a plurality of sensing devices 925. The light-emitting devices 924 may be the same as or similar to the light-emitting devices 124 in the previous embodiment. The sensing devices 925 may be the same or similar to the sensing devices 125 in the previous embodiment. The display 930 may be similar to the display 130 in the foregoing embodiment.

In this embodiment, the light-emitting device 924 and the sensing device 925 of the eye tracker 920 may be disposed at different positions. That is, the light-emitting device 924 and the sensing device 925 of the eye tracker 920 can be far away from each other. For example, the sensing device 925 of the eye tracker 920 may be configured on the optical combiner 110, and the light-emitting device 924 of the eye tracker 920 may be configured on the display 930. The tracking beam 924R emitted from the light-emitting device 924 of the eye tracker 920 can be guided to the optical combiner 110 through a suitable light guide 140. The external beam ER, the display beam 930R and the tracking beam 924R can be irradiated to the eyeball 91 of the wearer 90 through the optical coupler 114 of the optical combiner 110.

In this embodiment, the display device 931 of the display 930 and the light-emitting device 924 of the eye tracker 920 may be arranged in an array, but the disclosure is not limited thereto.

In this embodiment, the light-emitting device 924 of the eye tracker 920 may not be disposed on the optical combiner 110, but the disclosure is not limited thereto.

In this embodiment, the sensing device 925 of the eye tracker 920 surrounds the optical coupler 114, but the disclosure is not limited thereto.

Figure 10:
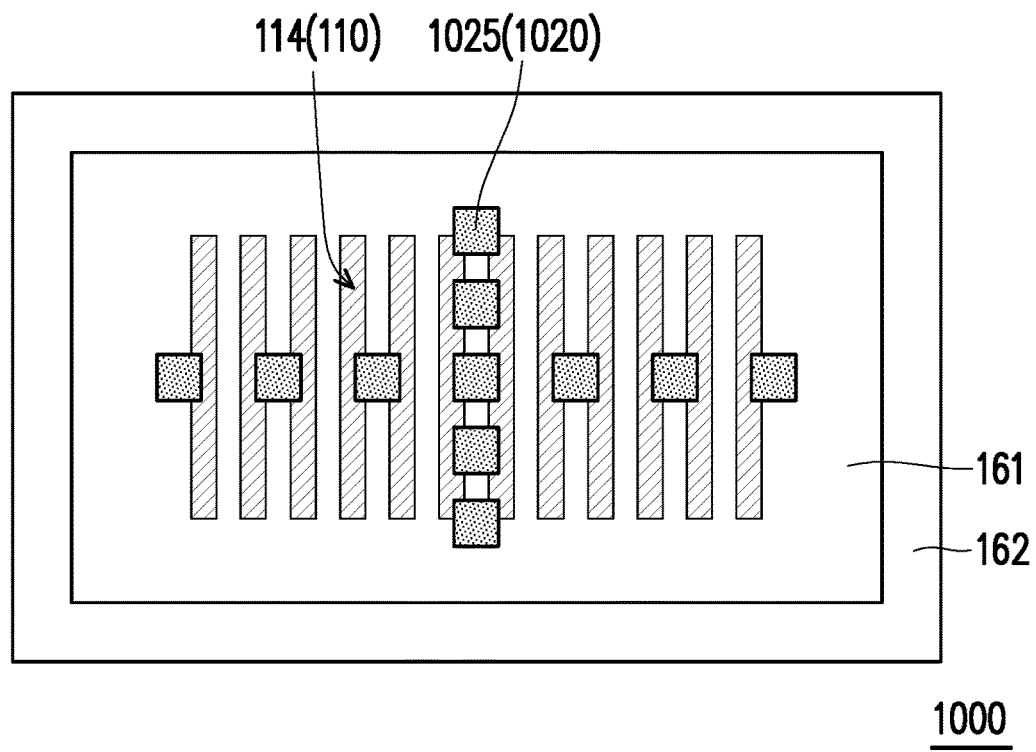
FIG. 10 is a schematic partial front view of a head-mounted eye tracking system according to the tenth embodiment of the disclosure.

FIG. 10 is a schematic partial front view of a head-mounted eye tracking system according to the tenth embodiment of the disclosure. The head-mounted eye tracking system 1000 of this embodiment is similar to the head-mounted eye tracking system 900 of the ninth embodiment, and similar components in the embodiment are denoted by the same reference numerals and have similar functions, and related description is omitted. In addition, for clarity, not all the sensing devices 1025 are marked or shown one by one in FIG. 10.

In this embodiment, the head-mounted eye tracking system 1000 includes an optical combiner 110, an eye tracker 1020, and a display (not shown directly, and may be the same or similar to the display 930 in the previous embodiment). The eye tracker 1020 may include a plurality of light-emitting devices (not shown directly, and may be the same or similar to the light-emitting devices 924 in the previous embodiment) and a plurality of sensing devices 1025. The sensing devices 1025 may be the same or similar to the sensing devices 125 in the previous embodiment.

In this embodiment, a plurality of sensing devices 1025 may be arranged in a cross shape.

Figure 11:
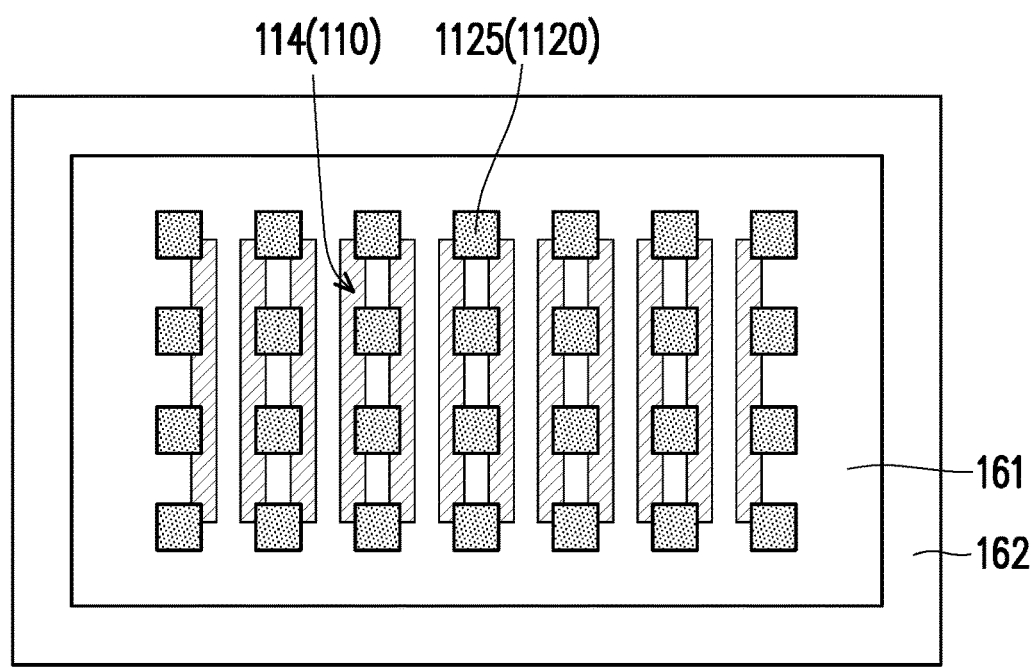
FIG. 11 is a schematic partial front view of a head-mounted eye tracking system according to the eleventh embodiment of the disclosure.

FIG. 11 is a schematic partial front view of a head-mounted eye tracking system according to the eleventh embodiment of the disclosure. The head-mounted eye tracking system 1100 in this embodiment is similar to the head-mounted eye tracking system 900 in the ninth embodiment, and similar components in the embodiment are denoted by the same reference numerals and have similar functions, and related description is omitted. In addition, for clarity, not all the sensing devices 1125 are marked or shown one by one in FIG. 11.

In this embodiment, the head-mounted eye tracking system 1100 includes an optical combiner 110, an eye tracker 1120, and a display (not shown directly, and may be the same or similar to the display 930 in the foregoing embodiment). The eye tracker 1120 may include a plurality of light-emitting devices (not directly shown, and may be the same or similar to the light-emitting devices 924 in the foregoing embodiment) and a plurality of sensing devices 1125. The sensing devices 1125 may be the same or similar to the sensing devices 125 in the previous embodiment.

In this embodiment, a plurality of sensing devices 1125 may be arranged in an array.

Figure 12:
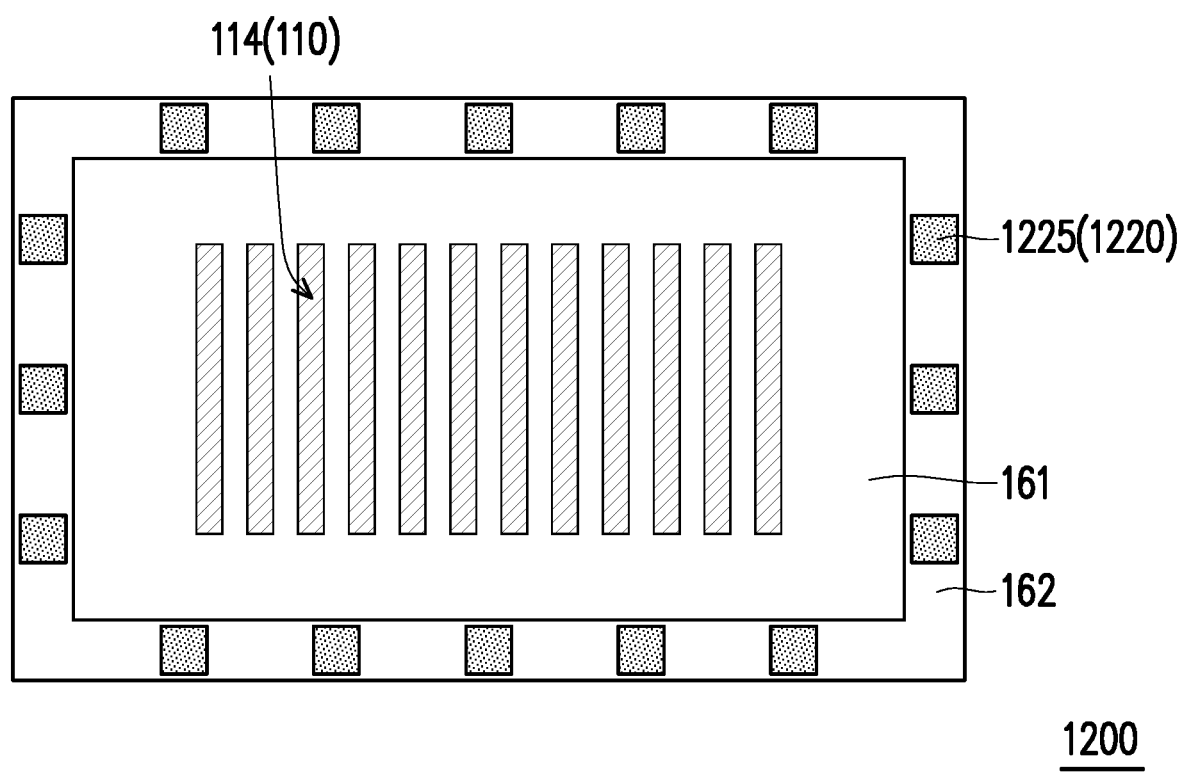
FIG. 12 is a schematic partial front view of a head-mounted eye tracking system according to the twelfth embodiment of the disclosure.

FIG. 12 is a schematic partial front view of a head-mounted eye tracking system according to the twelfth embodiment of the disclosure. The head-mounted eye tracking system 1200 in this embodiment is similar to the head-mounted eye tracking system 900 in the ninth embodiment, and similar components in the embodiment are denoted by the same reference numerals and have similar functions, and related description is omitted. In addition, for clarity, not all the sensing devices 1225 are marked or shown one by one in FIG. 12.

In this embodiment, the head-mounted eye tracking system 1200 includes an optical combiner 110, an eye tracker 1220, and a display (not shown directly, and may be the same or similar to the display 930 in the foregoing embodiment). The eye tracker 1220 may include a plurality of light-emitting devices (not shown directly, and may be the same or similar to the light-emitting devices 924 in the foregoing embodiment) and a plurality of sensing devices 1225. The sensing devices 1225 may be the same or similar to the sensing devices 125 in the previous embodiment.

In this embodiment, a plurality of sensing devices 1225 may be disposed on the frame 162.

In this embodiment, a plurality of sensing devices 1225 may surround the optical coupler 114.

In summary, the head-mounted eye tracking system of the disclosure is adaptable for sensing the eyeball movement of the wearer.

To sum up, in the head-mounted eye tracking system of the disclosure, the eye tracker can track the movement of the eyeball without forming an image. In this way, the sampling frequency of the sensing device can be increased correspondingly, the power consumption of the head-mounted eye tracking system during operation can be reduced, and the head-mounted eye tracking system can be integrated with other elements or devices more effectively.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A head-mounted eye tracking system, comprising:
a light-transmitting substrate, configured at a specific location relative to a pupil of eyeballs;
an optical combiner, integrated into the light-transmitting substrate to combine visual information in a specific direction, the optical combiner comprising an optical coupler;
an eye tracker at least partially configured on the optical combiner and adapted to sense the eyeballs of a wearer, the eye tracker comprising:
a plurality of light-emitting devices adaptable for emitting a tracking beam, wherein, when a first and second arrangement direction are perpendiculars, the plurality of light-emitting devices and a plurality of sensing devices at least partially overlap the optical coupler along a third direction that is perpendicular to the first and second arrangement directions; and
the plurality of sensing devices adaptable for receiving the tracking beam reflected by the eyeballs of the wearer; and
a signal processor signally connected to the eye tracker, wherein the optical coupler of the optical combiner and the eye tracker are disposed in a visual direction of the eyeballs of the wearer.

2. The head-mounted eye tracking system according to claim 1, further comprising:

a display adapted to emit a display beam, wherein the display beam is irradiated to the eyeballs of the wearer through the optical combiner.

3. The head-mounted eye tracking system according to claim 2, wherein the plurality of sensing devices are arranged on the optical combiner, and the plurality of light-emitting devices are arranged on the display.

4. The head-mounted eye tracking system according to claim 1, wherein the plurality of light-emitting devices or the plurality of sensing devices are arranged on the optical combiner.

5. The head-mounted eye tracking system according to claim 1, wherein a distance between two of the plurality of adjacent sensing devices is between 1 mm and 30 mm.

6. The head-mounted eye tracking system according to claim 1, wherein the plurality of light-emitting devices or the plurality of sensing devices surround the optical coupler.

7. The head-mounted eye tracking system according to claim 1, wherein the plurality of light-emitting devices or the plurality of sensing devices are arranged in an array.

8. The head-mounted eye tracking system according to claim 1, wherein in a first arrangement direction, part of the plurality of light-emitting devices and part of the plurality of sensing devices are arranged alternately with each other.

9. The head-mounted eye tracking system according to claim 8, wherein in a second arrangement direction perpendicular to the first arrangement direction, part of the plurality of light-emitting devices and part of the plurality of sensing devices are arranged alternately with each other.

10. The head-mounted eye tracking system according to claim 1, wherein at least one of the plurality of light-emitting devices and at least one of the plurality of sensing devices are integrated into a sensing unit.

11. The head-mounted eye tracking system according to claim 1, wherein the plurality of sensing devices are arranged in a cross shape.

12. The head-mounted eye tracking system according to claim 1, wherein the plurality of light-emitting devices or the plurality of sensing devices are disposed on a frame.

* * * * *